United States Patent [19]

Tolliver

[11] Patent Number: 5,303,536
[45] Date of Patent: Apr. 19, 1994

[54] LAWN RAKE WITH DEBRIS PILE CAPABILITY

[76] Inventor: Peter M. Tolliver, 42 Varinna Dr., Rochester, N.Y. 14618

[21] Appl. No.: 924,296

[22] Filed: Aug. 3, 1992

[51] Int. Cl.5 .............................................. A01D 7/06
[52] U.S. Cl. ................................ 56/400.12; 56/400.13; 56/400.15
[58] Field of Search ............ 56/400.12, 400.11, 400.13, 56/400.14, 400.15

[56] References Cited

U.S. PATENT DOCUMENTS

| 3,164,945 | 1/1965 | Spencer | 56/400.12 |
| 4,185,448 | 1/1980 | Blanco | 56/400.12 |
| 4,292,794 | 10/1981 | Gascon | 56/400.12 X |
| 4,378,671 | 4/1983 | Gascon | 56/400.12 |
| 4,667,461 | 5/1987 | Forbes | 56/400.15 |

FOREIGN PATENT DOCUMENTS 15589  12/1933  Australia ............ 56/400.15

Primary Examiner—Terry Lee Melius

[57] ABSTRACT

A lawn rake with debris pickup capability is disclosed. The lawn rake is particularly useful as an implement for raking leaves/debris from a grassy lawn into piles, then to encircle/grasp the debris pile for lifting, transport and dumping. In using the Lawn rake, the operator does not have to bend over to pick up leaf/debris piles.

11 Claims, 4 Drawing Sheets

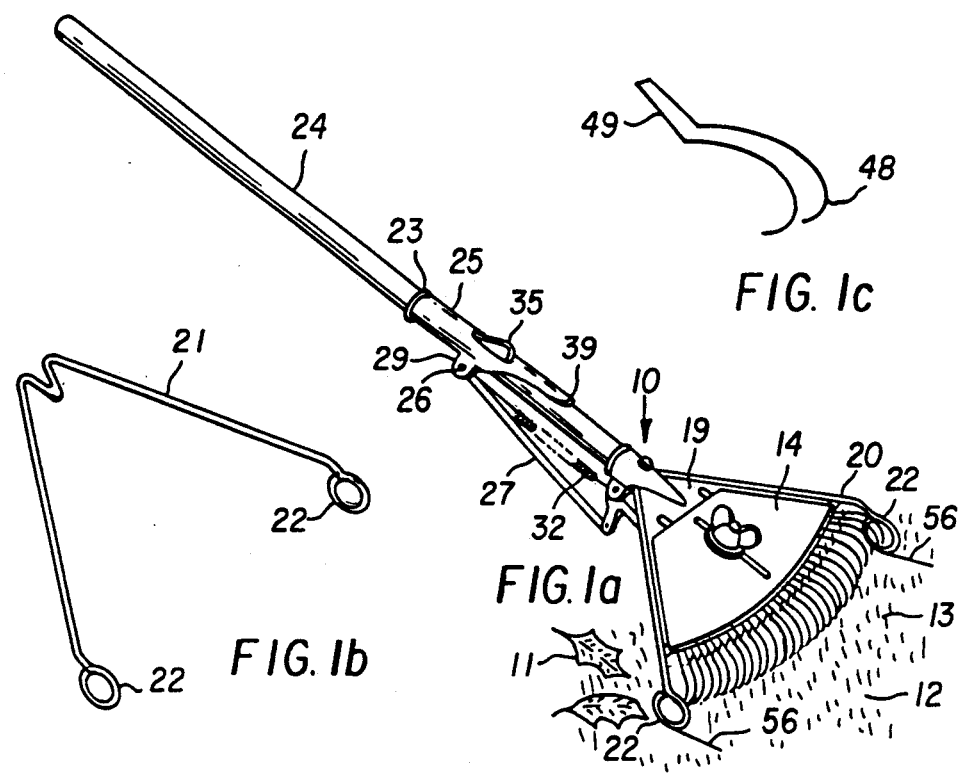
FIG. 1c
FIG. 1b
FIG. 1a
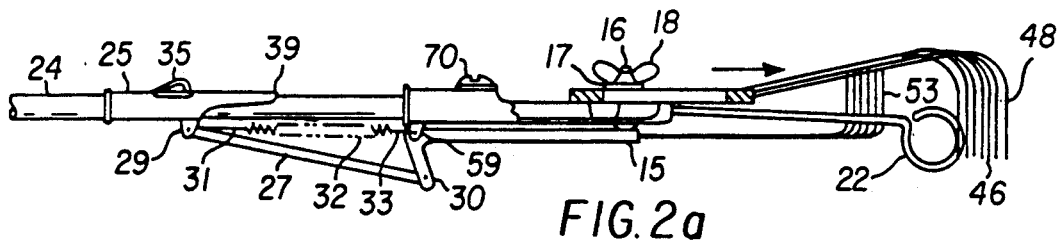
FIG. 2a
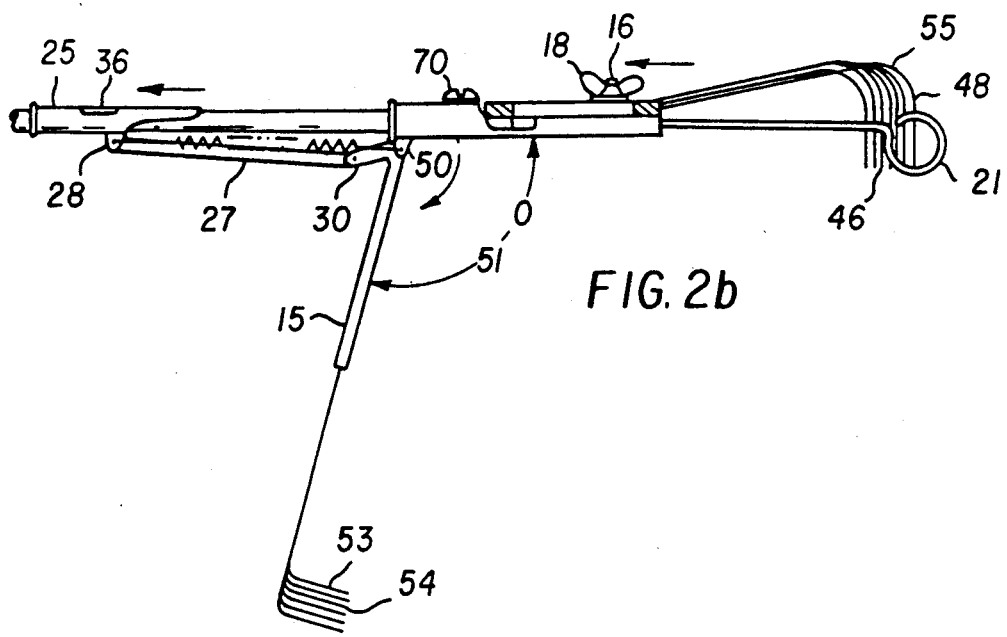
FIG. 2b

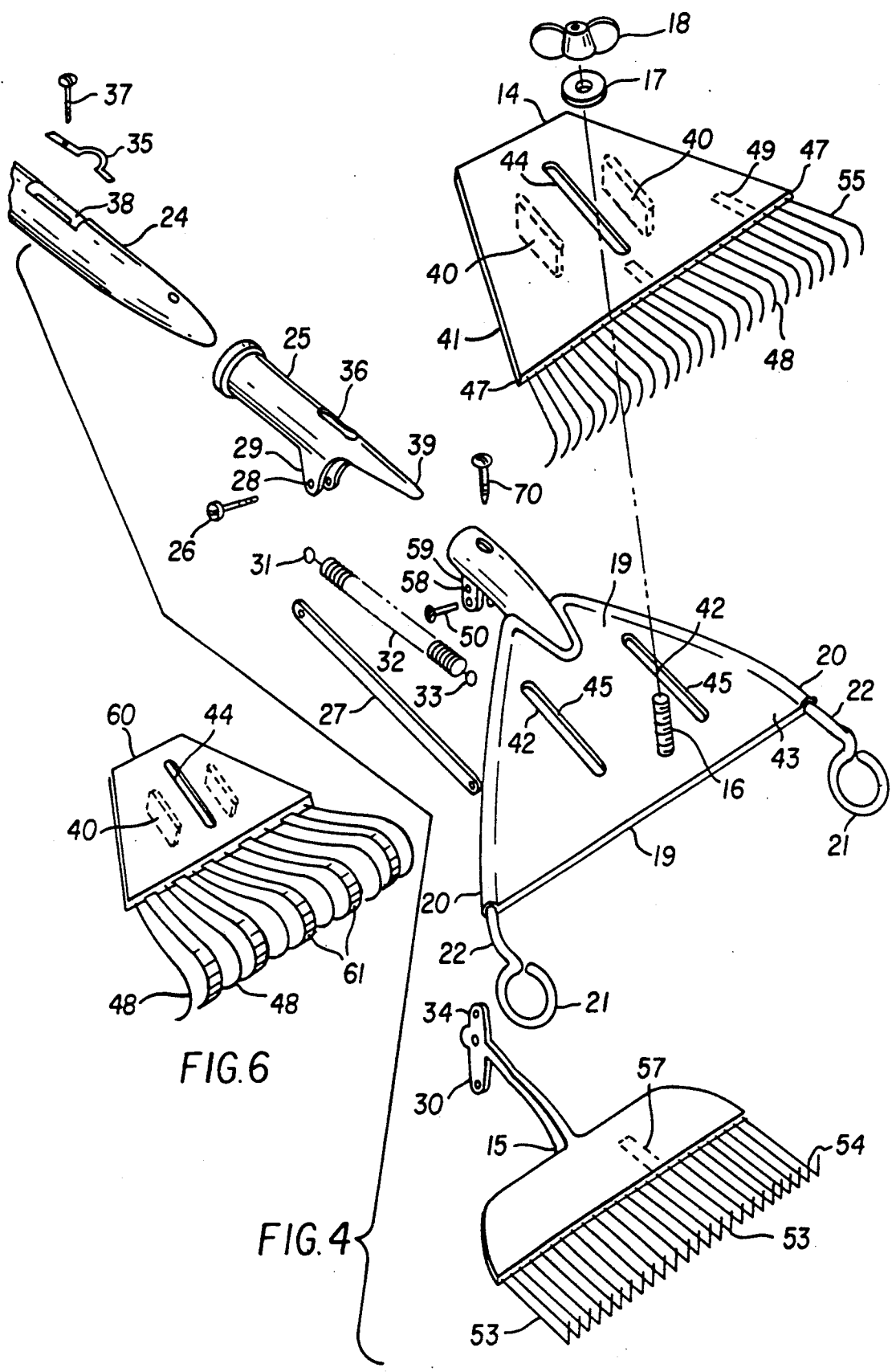

LAWN RAKE WITH DEBRIS PILE CAPABILITY

BACKGROUND OF THE INVENTION

1. Field of the Invention

The present invention relates to a rake implement, for sifting/combing leaves/debris from a grassy lawn, which also has the capability for leaf/debris pile pickup for transport and dumping.

2. Prior Art

Attempts have been made in the past to provide leaf rakes or lawn combing devices that will have low frictional drag (as used in the raking process) and can store a growing quantity of leaves as they are being raked from a lawn. In addition, the picking up of leaves, after they have been gathered into small piles from raking, has been done by using a shovel, pitchfork, a second leaf rake to entrap the leaf pile between the two rakes, or use of the hand to push the leaf pile against the inside surface of the leaf rake's rack assembly to trap the leaf pile for lifting. Other means, such as raking a quantity of leaves onto a large surface cloth sprawled on the ground to allow them to be bundled together to be dragged away, or pushing a pile with a shovel, or other means such as hand pressing them into a trash can laid over on its side.

Relevant prior art devices used for raking leaves are described in U.S. Pat. No. 2,137,608 issued on Nov. 22, 1938 to W. K. Flavin and U.S. Pat. No. 3,688,483 entitled "Multi-Purpose Household Garden and Yard Hand Tool," issued to Dave H. Hamilton. This latter patented device has a bag attached to the rake which the operator manipulates to scoop up a pile of leaves.

Known leaf rakes are usually comprised of a rake assembly having tines that extend outward from a triangularly shaped plate-like frame at one end, and mounting means for its attached handle at the other end. Leaf rakes are commonly used to gather and remove fallen leaves from a grassy lawn without damaging the lawn surface or the grass growing therein. Many popular present-day leaf rakes are made of plastic (reinforced with metal) having multiple tines (which are long narrow contoured rectangular strips that extend outward from a triangularly shaped base). Rakes with designs such as this, tend to rub leaves off the grass and considerable effort (energy) must be exerted to separate leaves from the grass matt in applying a downward/pulling force. The greater the downward pulling force exerted in raking, the greater the frictional resistance to pulling the rake. An increase in frictional resistance, requires more work (Force X Displacement) to be exerted/expended in the raking process.

Still other types of leaf rakes utilize tines of contoured wire that are operated in raking just as the aforementioned rake types. There is a variety of hand operated rake types on the commercial market, they all are operated in a manner similar to that described above. They differ mostly in their composition materials. Leaf rake types now in use for separating leaves from lawn grass do the job, while requiring the exertion of considerable effort (work, energy), including bending over by the operator to grasp and pick up the leaf pile, or pulling along a growing pile of gathered leaves for eventual pickup and disposal.

Conventional garden rakes, which usually have short stiff metal blunt pointed tines, cannot be used successfully in raking leaves from lawn grass, as the tines tend to dig into the turf (which inhibits smooth raking) and damage it. However, ordinary rakes (lawn or leaf) do not have the physical structure for being used to grasp and pick up a pile of leaves to transport it.

None of the aforesaid prior art and no other means, known to this applicant, attempts to utilize outrider skis in combination with an adjustable (up and down) tine rack that can enable the rake operator to selectively alter and control the depth of penetration of the rake's tines into the grass. Also, no other hand operated lawn rake device utilizes an attached second rack, a prong rack, for grasping a leaf/debris pile for lifting/transporting. No other leaf rake offers an adjustable tine rack that is fitted with contoured circular rod tines, contoured flat tines or alternating combination of flat and rod tines that can provide regular raking capability and/or the combing capability. Still another embodiment of the lawn comb utilizes a jointed spring-loaded prong rack that bends from the action of its V-shaped coil springs to facilitate the encircling and grasping of a leaf/debris pile.

SUMMARY OF THE INVENTION

Briefly described, the present invention relates to a lawn comb/leaf rake device and more particularly to an improved leaf rake in accordance with a preferred embodiment of the invention having the combined capability of use in raking or combing leaves/debris from a leaf covered grassy lawn into piles and to pick up piles of gathered leaves for transport and dumping. The implement comprises a mainframe base assembly (from which a V-formed pair of outrider skis extends, and to which a tine rack assembly, a prong rack assembly {tines/prongs of these two assemblies are arrayed to mesh together} and a handle are attached), cylindrical sleeve mechanism (mounted on and concentric with the rake handle and joined by a connecting rod {under spring tension} to the hinged prong rack assembly) to operate it from a closed/meshed position to an open-for-loading position. The Lawn Comb is particularly useful in combing or gathering scattered leaves/debris into piles, then forming a wedge-shaped empty volume between the tine and prong racks (as the cylindrical sleeve mechanism is pulled back against spring tension by the operator) for encircling, grasping, lifting, and transporting a volume of leaves for disposal. When the cylindrical sleeve mechanism is released, the restoring spring pulls the two racks back to the closed/meshed operational raking position.

Outrider skis, that slide along the turf surface and support the tines elevated above the turf at adjustable levels, provide the capabilities for adjusting the vertical depth of penetration of the tines (into the grass) and low friction raking. Riding on skis allows the tines to sift or comb through the grass during the raking process without digging into the turf. The tine rack can be adjusted downward to a level such that the skis do not touch the ground surface. In this position, the Lawn Comb is usable as an ordinary rake. Also, the tine rack can be adjusted up to a level such that the tine end tips are elevated several inches above ground surface, thus enabling raking at the top of tall lawn grass.

The tines of the tine rack can be of different construction. They can be: contoured round rods; contoured flat strips; or a combination of alternating flat strips and rods. In use, the contoured rod tines comb/sift through the grass to ferret out leaves/debris. The contoured flat strip tines in use tend to scrape leaves/debris off the turf. A combination of alternating strip and rod tines is very effective in scraping and sifting leaves/debris out from grassy lawns.

Three other useful embodiments of the Lawn Comb are: a design that does not have outrider skis (but has a prong rack assembly); one that does not have a prong rack assembly (but has outrider skis); and a design having a jointed prong rack assembly (wherein the prong rack can bend automatically to facilitate pile pickup).

The embodiment with no outrider skis, but having the manipulative prong rack assembly, will have the pile pickup capability and not have the low friction raking or adjustable raking depth capability. Its tines would be of the contoured flat strip type.

The embodiment that has outrider skis, but no prong rack assembly, could not be operated to pick up a leaf pile. This Lawn Comb embodiment would retain its capability for adjustment in depth of penetration of the tines into the grass and that of low friction combing through the turf to remove leaves/debris. Its tines could be either of strips, rods or a combination of both.

Still another embodiment of the Lawn Comb has a jointed prong rack assembly that is spring loaded to bend at its joint to an angle of $\phi°$ (for $\phi \leq 35°$, when there is no outside counter force applied to the jointed prong rack). When the jointed prong rack is in mesh (with the tine rack in the locked closed position), the bend at the joint is approximately $\phi = 0°$; the jointed prong rack becomes nearly straight. When the cylindrical sleeve mechanism is unlatched and being pulled back to separate the jointed prong rack from being meshed with the tine rack, the jointed prong rack begins to bend forward at its joint because of the bending torque supplied by its V-shaped coil springs. The angle of bend of the extended prong section of the jointed prong rack, relative to the prong rack short arm, is limited by mechanical stops built into the extended prong rack section.

When the separated tine and jointed prong racks have been positioned by the rake operator to encircle a pile of leaves, he/she then pushes forward on the cylindrical sleeve. This force begins to close (rotate the prong rack toward the tine racks) these two racks together to encircle, trap and squeeze the debris pile.

The trajectory of the prongs' L-shaped forward ends, in the closing of the two racks to encircle a pile of leaves, traces a path nearly parallel to ground surface as the bend in the jointed prong rack straightens as the interstitial leaves are compacted by these racks' convergence. The nearly straight sweep over ground surface maximizes pile grasping/pickup capability of the implement.

BRIEF DESCRIPTION OF THE DRAWINGS

The invention will be better understood upon consideration of the following detailed description taken together with the accompanying drawings in which like elements in various figures have like designations and in which:

FIG. 1a is an oblique view of the lawn comb in accordance with a preferred embodiment of the invention ready for use in raking or combing leaves from a grassy lawn. In use, the rake is held at an angle of approximately 40° with the surface being raked; depending upon the height of the operator.

FIG. 1b illustrates the outrider ski pair, formed roughly into a V and substantially imbedded in the mainframe base member, with closed circular loops at the two extremities in a preferred embodiment of the invention.

FIG. 1c is an oblique view of a tine pair in a preferred embodiment of the invention.

FIG. 2a is a side view of the lawn comb wherein the prong and tine racks are meshed and ready for use in raking, in accordance with a preferred embodiment of the invention.

FIG. 2b is a side view of the device with the prong rack pulled open creating an empty wedge-shaped volume between the tine and prong racks, ready for the pickup of piles of leaves/debris in accordance with a preferred embodiment of the invention.

FIG. 4 shows a dissection of the lawn comb into subassemblies and parts.

FIG. 6 illustrates a modified tine rack assembly having alternating contoured round rod tines and contoured flat strip tines.

DESCRIPTION OF THE PREFERRED EMBODIMENTS

Figure 3A:
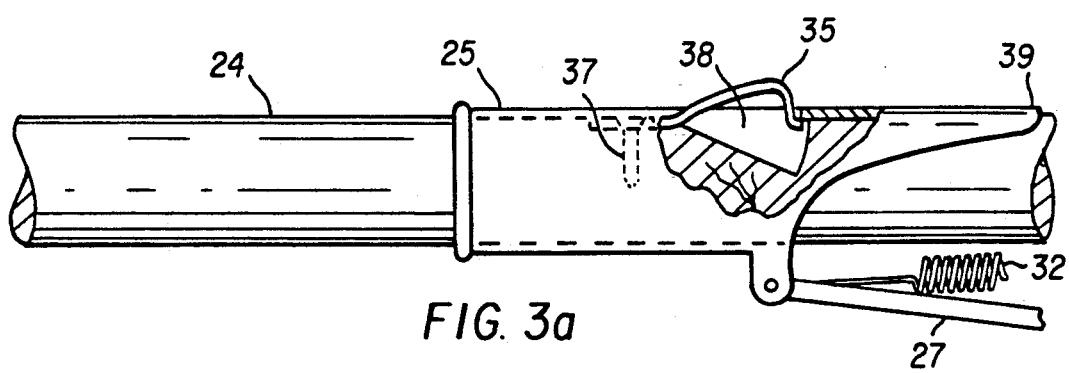
FIG. 3a shows the cylindrical sleeve mechanism in its forward latched position, as in FIG. 2a, wherein the tine and prong racks are meshed together in a preferred embodiment of the invention.

Referring to FIGS. 1a, 1b and 1c, FIG. 1a shows the lawn comb (or leaf rake) 10 with pile pickup capability, in accordance with a preferred embodiment of the invention. The invention is useful in raking leaves 11 or other debris from grass 12 that covers lawn 13. Lawn comb 10, comprising a pair of opposing members, namely tine rack 14 and prong rack 15, is shown in position ready for use. Tine rack 14 is attached by screw 16, flat washer 17 and butterfly nut 18 to mainframe base member 19, see FIGS. 2a, 2b and FIG. 4. Protruding from forward flanks 20 of mainframe base member 19 are two extremities of V-shaped outrider ski pair 21 formed into closed circular ski loops 22 (a safety feature), see FIG. 1b. Mainframe base member 19 has a handle mounting socket 23, see FIG. 1a, into which handle 24 is mounted and secured by screw 70. A hand operated cylindrical sleeve mechanism 25, fits coaxially over handle 24. Anchor screw 26, see FIG. 4, attaches rigid connecting rod 27 to connection point 28, of stud post 29 on cylindrical sleeve 25, and to pivot arm 30 of prong rack 15, see FIG. 2a. Also connected to connection point 28 is rear end 31 of restoring spring 32, see FIG. 4. Forward end 33 of restoring spring 32 is connected to restoring arm 34 of prong rack 15. With this arrangement, cylindrical sleeve 25 is held forward by tension from restoring spring 32, until unlatched and pulled back along handle 24 by the human operator. To pull back cylindrical sleeve 25, latch orifice 36 of cylindrical sleeve 25 and is mounted on handle 24 and held in place by latch set screw 37, must be depressed into handle niche 38. As cylindrical sleeve 25 is manually pulled back, latch cover 39, which is a forward extension of cylindrical sleeve 25, holds down latch lock spring 35. When cylindrical sleeve 25 is manually returned forward for latching, the restoring spring action of latch lock spring 35 serves as a latch to lock and prevent prong rack 15 from separating from tine rack 14 during the raking process.

Tine rack 14, has two parallel rectangular studs 40, see FIG. 4, mounted on underside 41 of tine rack assembly 14, that fit into two parallel slots 42 in triangularly shaped mainframe base plate 43 of mainframe base member 19. There is also a single slot 44 in tine rack 14 (that is parallel to and aligned with rectangular studs 40) through which setscrew 16 protrudes upward for holding tine rack 14 aligned and in place. When the position of tine rack 14 is adjusted, translated up or down along mainframe base member 19, rectangular studs 40, which extend down into and fit/slide within the contiguous inside surfaces 45 of double slots 42 of mainframe base plate 43, add structural strength and prevent yawing motion between tine rack assembly 14 and mainframe base member 19. Tine rack 14 has, protruding from its forward (wider) end 47 a multiplicity of contoured tines 48 angling upward, then curving downward and hooking slightly backward (a safety feature), as illustrated in FIG. 1c. Tines 48 are similar in shape. Tines 48 are formed in pairs 49, see FIG. 1c, this unified construction, from one length of material, enables each individual tine 48 of tine pair 49 to resist the rotational torque component of the applied raking force.

Figure 3B:
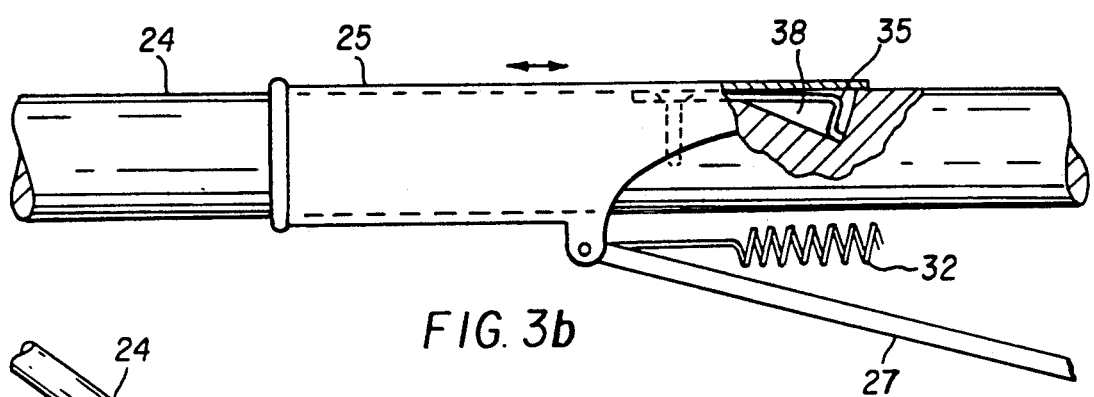
FIG. 3b illustrates the cylindrical sleeve mechanism in the pulled-back position, wherein the prong rack is separated from the tine rack, as in FIG. 2b, in accordance with a preferred embodiment of the inventions. The latch cover extension holds down the latch lock spring while the cylindrical sleeve is pulled-back.
Figure 5:
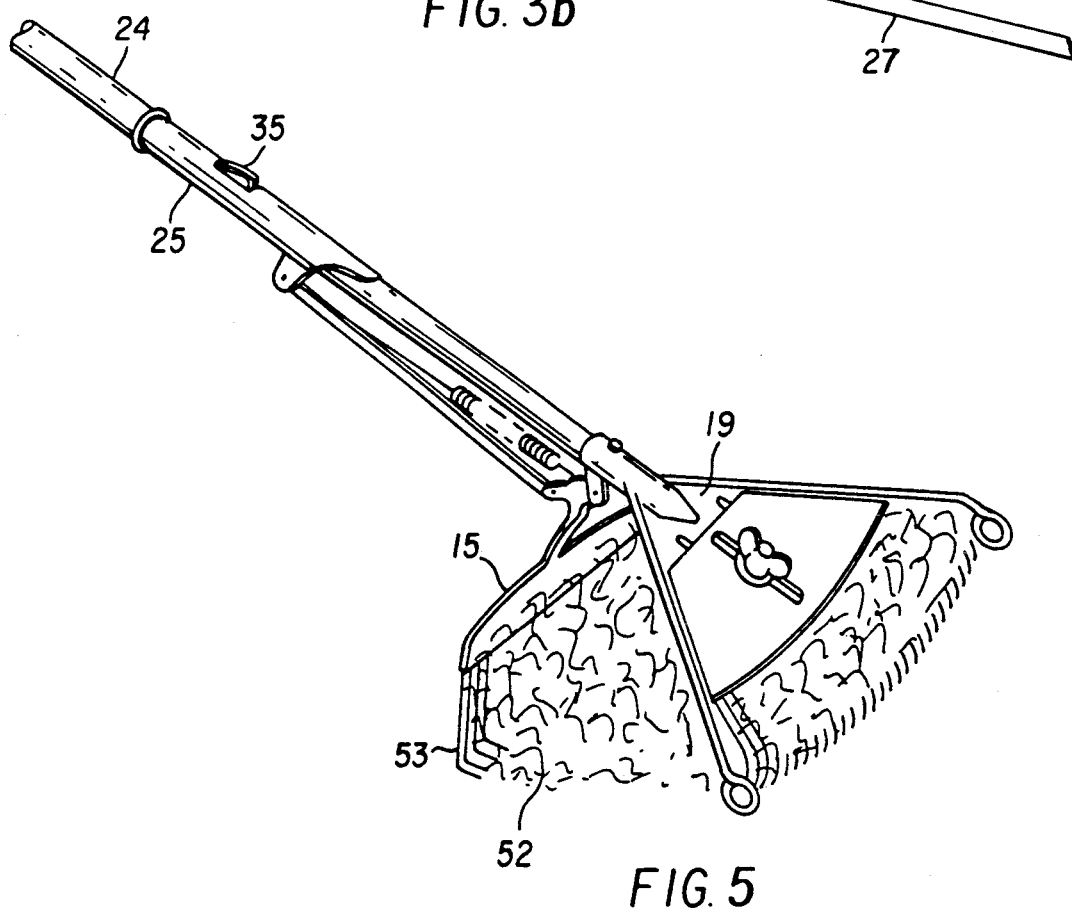
FIG. 5 is an oblique view of the device fully loaded with a volume of leaves in-the-grasp of (or pinched between) its tine and prong racks.

Prong rack 15 can be rotated about pivot axle 50, from a closed position (meshed with tine rack 14, see FIG. 2a) to an open position to form an open-for-loading wedge shaped empty volume 51 there in-between, see FIG. 2b, which can be positioned by a human operator to encircle a volume of leaves 52 for grasping and lifting, see FIG. 5. Prong rack assembly 15 need not be as wide as tine rack 14 to be highly effective for pile pickup. L-shaped prongs 53, that emanate from prong rack 15, are oriented to point upward, see FIG. 4, to increase the grasping and holding capability of lawn comb device 10 as used to pick up a volume of leaves 52. Upturned L-shaped prongs 53 together with downward turned contoured tines 48 of tine rack 14, serve to grasp and squeeze a volume (or pile 52) of leaves/debris 11 when cylindrical sleeve 25 is pushed forward by a human operator. End points 54 of upward turned prongs 53 do not extend up above shanks 55 of tines 48 (as a safety feature) of Lawn Comb 10. When latch lock spring 35 is depressed (into handle niche 38, see FIG. 3b) this releases cylindrical sleeve 25 to be pulled back. This action stretches restoring spring 32, and also pulls back connecting rod 27 which pulls pivot arm 30 to rotate prong rack 15 away from tine rack 14, creating the empty wedge shaped open-for-loading cavity 51 in between racks 14 and 15, see FIG. 2b.

Lawn comb 10, in use, is extended outward over a leaf covered grassy lawn 12, lowered until outrider ski loops 22 contact turf surface 13, then pulled back toward the human operator in repeated raking motions. Outrider ski loops 22 in contact with turf surface 13, see FIG. 1a, slide easily over grass 12 making faint parallel tracks 56. During this raking action, tines 48 sift/comb through grass 12 ferreting out leaves/debris 11. Outrider skis 21 support tine end tips 46 at a selected elevation above ground surface 13. The depth of penetration of tines 48 into grass 12 is controlled by adjusting tine rack 14 up or down along mainframe base member 19. Prong rack 15 is held securely up against and meshed with tine rack 14; prongs 53 is tines 48 are meshed together, as in FIG. 2a, during the raking process.

Tine rack 14 can be freed to be adjusted up or down mainframe base member 19 by loosening butterfly nut 18. Tine rack 14 can be moved down sufficiently far such that outrider ski loops 22 do not touch ground surface 13. In this position, see FIG. 2a, lawn comb 10 becomes usable as an ordinary leaf rake. Tine rack 14 can also be moved upward to an elevation above ski loops 22, see FIG. 2b, such that tine end tips 46 are several inches above ground surface 13. This setting is for raking leaves/debris 11 from tall grass 12. FIG. 1a shows lawn comb 10 in position to comb/rake leaves 11 from lawn grass 12, this is the normal mode of operation of lawn comb 10. FIG. 5 illustrates lawn comb 10 in a unique operating mode in that prong rack 15 is separated from tine rack 14 forming a wedge shaped empty volume 51 in which a pile of gathered leaves 11 has been captured. FIG. 2b illustrates prong rack 15 pulled open as it would be for dumping a load/pile of gathered leaves 11.

In normal operation, restoring spring 32 applies a forward pulling bias to cylindrical sleeve 25, along rake handle 24. When the hand operated cylindrical sleeve mechanism 25 is full forward and latched, prong rack 15 is held in physical contact up against tine rack 14, wherein prongs 53 are meshed with tines 48, as shown in FIG. 2a.

As an economic variation in the means for connecting front end 33 of restoring spring 32, the front end 33 can be connected directly to an anchor point 58 on forked prong rack mounting post 59, see FIG. 4. This mounting scheme is less expensive to implement, as prong rack 15 would have no restoring arm 34. However, it provides less restoring force for returning prong rack 15 to mesh/close with tine rack 14. When a restoring arm 34 is used on prong rack 15, it increases the stretching tension applied to restoring spring 32, thereby increasing its restoring force. FIG. 5 shows an oblique view of lawn comb 10 with a load of gathered leaves 11 in-the-grasp, sandwiched between prong rack 15 and tine rack 14. FIG. 4 shows a breakdown of lawn comb 10 into subassemblies and parts.

FIG. 6 shows a modified tine rack assembly 60 that has alternating contoured circular rod tines 48 and contoured flat strip tines 61.

Figure 7A:
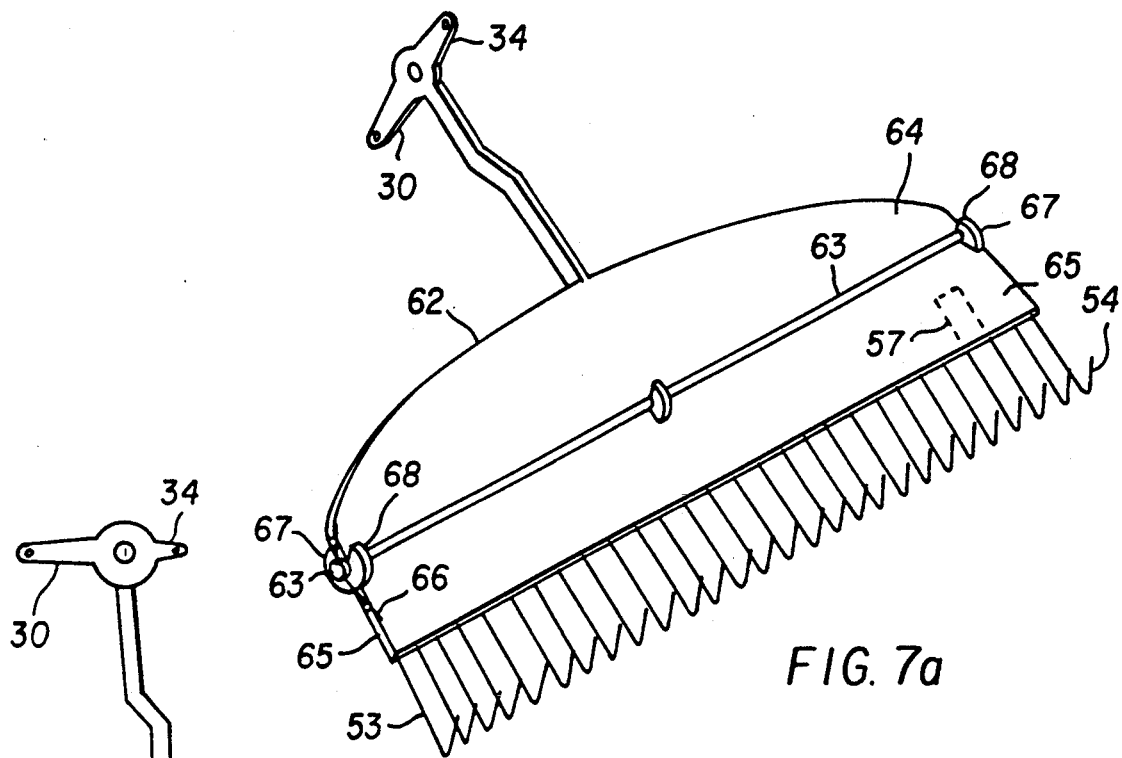
FIG. 7a shows an oblique view of the jointed prong rack assembly with its two sections, prong rack short arm and extended prong section, linked/hinged together in a preferred embodiment of the invention. The two sections are aligned flat ($\phi = 0°$).
Figure 7B:
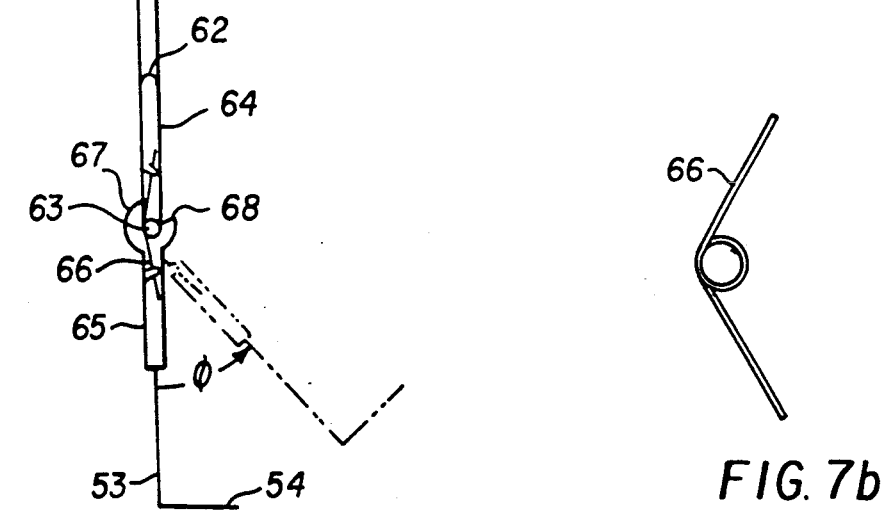
FIG. 7b shows a V-shaped coil spring used for forcing the jointed prong rack to bend to its maximum bend-angle $\phi$, when there is no opposing force.
Figure 7C:
FIG. 7c shows the two sections of the jointed prong rack assembly, aligned flat and as dashed in, bent at the hinged joint to its maximum bend-angle of $\phi = 35°$.

With reference to FIGS. 7 (a, b and c), FIG. 7a shows an oblique view of a jointed prong rack assembly 62 having a spring-loaded hinged joint 63 between prong short arm 64 and extended prong section 65. Two coiled V-shaped springs 66, see FIG. 7b, mounted on either end 67 of hinged joint 63 (see FIG. 7a) provide a bending torque which tends to rotate extended prong section 65 forward, see FIG. 7c. Limiting stops 68 are included on extended prong section 65 to prevent jointed prong rack 62 from bending more than ~35°. When jointed prong rack 62 is held locked flat up against tine rack 14, as shown in FIG. 2a, lawn comb 10 is usable for raking/combing leaves 11 from lawn grass 12. The bend-angle, $\phi$, of jointed prong rack 62 will equal 0° when locked flat up against tine rack 14. When cylindrical sleeve 25 is unlatched and is being pulled back, while tines 48 of tine rack 14 are held elevated just above turf surface 13 by outrider skis 21, jointed prong rack 62 begins to rotate away from its meshed/closed position with tine rack 14, also jointed prong rack 62 begins to bend forward at its hinged joint 63. When jointed prong rack 62 is open to its maximum angle ($\phi=120°$, see FIG. 2b), V-shaped coil springs 66, which are attached at both ends 67 of hinged joint 63, (will have forced jointed prong rack 62 to bend forward to its maximum bend-angle $\phi$ (for $\phi=35°$, see FIG. 7c). The automatic forward bending feature of jointed prong rack 62 in use on lawn comb 10, provides an improved leaf pile pickup capability. When the operator manually pushes forward on cylindrical sleeve 25 (restoring spring 32 is pulling cylindrical sleeve 25 forward toward the latched position) while holding handle 24 with the other hand, captured leaf pile 52 is compressed and held firmly for lifting and transport to a dumping site. As leaf pile 52 is squeezed between tine rack 14 and jointed prong rack 62, the reaction force from compressing leaf pile 52 begins to straighten jointed prong rack 62 (angle $\phi$ approaches zero). As jointed prong rack 62 straightens, rotating about its hinged joint 63, L-shaped forward ends 54 of prongs 53 trace a partially elliptical path in their closing trajectory that is nearly parallel with ground surface 13 over an extended elliptical arc. Because the closing trajectory of forward end tips 54 of prong rack 62 is nearly parallel to ground surface 13, lawn comb 10, outfitted with jointed prong rack 62, can efficiently and easily pick up piles 52 of gathered leaves 11 from lawn surface 13.

Having thus described the invention, it will be evident that other modifications and alterations may be proposed by those skilled in the art. For example: restoring spring 32 could be omitted, the result would be greater difficulty in grasping a leaf pile 52 for pickup; different means can be provided for operating prong rack assembly 15 (including the locking, releasing, opening, and closing mechanisms) for pile pickup; the two rack assemblies, 14 and 15, can be of different shapes, materials, and relative placement; and other such variations for operating lawn comb 10. Such modifications would come within the scope of the annexed claims.

What is claimed is:

1. A rake having debris raking and debris pickup capabilities comprising:
    an elongated handle;
    a mainframe base member secured to one end of the handle, the base member having a socket at one end secured to the one end of the handle and a flat section at the opposite end of the base member;
    a substantially flat tine rack slidably mounted on the flat section of the base member for lengthening or shortening the position of the tines relative to the handle;
    a screw means for releasably securing the flat section of the base member and the flat tine rack together in a selected tine position;
    a prong rack pivotally mounted on the base member for movement relative to the tine rack between a closed position in which the prong rack engages the tine rack for debris raking, and an open position in which the prong rack cooperates with the tine rack to form a cavity for debris encirclement, grasping and pickup; and
    a manually movable means on the handle coupled to the prong rack for operating the prong rack between its closed and open positions.

2. A rake according to claim 1, and further comprising spaced outrider skis extending from one side of the base member.

3. A rake according to claim 2 wherein the exposed free ends of the skis are loop-shaped.

4. A rake according to claim 1, and further comprising guide means comprising an elongated slot extending through one of the flat section and tine rack for slidably receiving a rectangular stud on the other of the flat section and tine rack.

5. A rake having debris raking and debris pickup capabilities comprising:
    an elongated handle;
    a mainframe base member secured to one end of the handle;
    a tine rack mounted on the base member;
    a prong rack comprising a flat member pivotally mounted on the base member for movement relative to the tine rack between a closed position in which the prong rack engages the tine rack for debris raking, and an open position in which the prong rack cooperates with the tine rack to form a cavity for debris encirclement, grasping and pickup, the prong rack having a plurality of prongs extending from one of the sides thereof, and a prong rack arm extending from a side opposite the one side; and
    a manually movable means on the handle coupled to the prong rack arm for operating the prong rack between its closed and open positions.

6. A rake according to claim 5 wherein the base member has a laterally extending mounting post thereon to which the prong rack arm is pivotally secured.

7. A rake according to claim 6 wherein the handle is cylindrical and the prong rack manual moving means comprises a cylindrical sleeve slidably mounted on the handle and having a stud post, a rigid connecting rod coupling the stud post to the prong rack arm, and a spring connecting the stud post of the cylindrical sleeve to one of the prong rack arm and base member for biasing the prong rack to its normally closed position.

8. A rake according to claim 7 and further comprising latch means on the handle having a normal latched position for releasably engaging the cylindrical sleeve for holding the prong rack in its closed position.

9. A rake according to claim 8 wherein the sleeve has a slot, and wherein the latch means comprises a leaf type spring mounted in a recess in the handle, the spring having a shoulder protruding through the slot in the sleeve for engaging an end of the slot in the normal latched position of the prong rack.

10. A rake according to claim 5 wherein the prong rack comprises a spring biased joint extending across the width of the prong rack flat member that with no load automatically bends at the joint toward the tine rack to improve/facilitate encircling, grasping and holding leaf/debris piles during pickup.

11. A rake according to claim 5 wherein the prong rack arm is substantially T-shaped.

* * * * *